United States Patent [19]

Baum et al.

[11] Patent Number: 5,195,108

[45] Date of Patent: Mar. 16, 1993

[54] SYSTEM AND METHOD FOR DETERMINING ABSOLUTE PHASE OF A DIFFERENTIALLY-ENCODED, PHASE-MODULATED SIGNAL

[75] Inventors: Kevin L. Baum, Hoffman Estates; Bruce D. Mueller, Palatine, both of Ill.

[73] Assignee: Motorola, Inc., Schaumburg, Ill.

[21] Appl. No.: 767,963

[22] Filed: Sep. 30, 1991

[51] Int. Cl.$^5$ .................................... H04L 27/22
[52] U.S. Cl. ........................... 375/84; 375/79; 375/80; 329/304
[58] Field of Search ............... 375/84, 79, 80; 329/304

[56] References Cited

U.S. PATENT DOCUMENTS

| 4,682,117 | 7/1987 | Gibson | 375/80 |
| 4,879,728 | 11/1989 | Torallo | 375/84 |

Primary Examiner—Curtis Kuntz
Assistant Examiner—T. Ghebretinsae
Attorney, Agent, or Firm—Robert H. Kelly

[57] ABSTRACT

System and method for determining an absolute phase value of a differentially-encoded, DQPSK signal. A stored set of sequences of an ID sequence is compared with a received ID-sequence of a differentially-encoded, DQPSK signal transmitted to the receiver. The stored and the received ID sequences are correlated, and the stored values of the ID sequence are adjusted by the value of the calculated correlation.

30 Claims, 4 Drawing Sheets

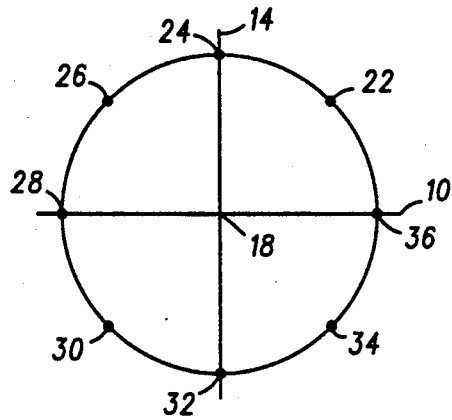
FIG.1A
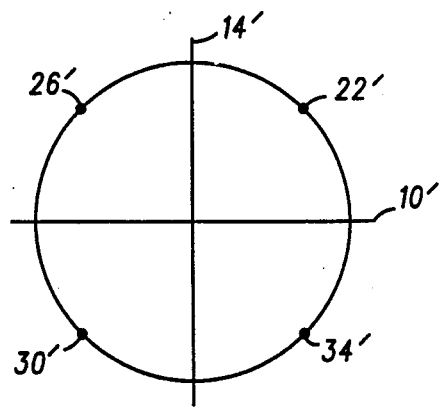
FIG.1B
FIG.2
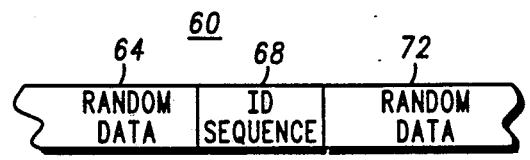
FIG.3
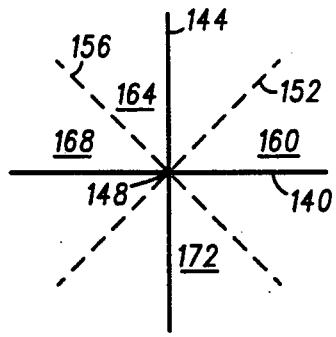
FIG.5
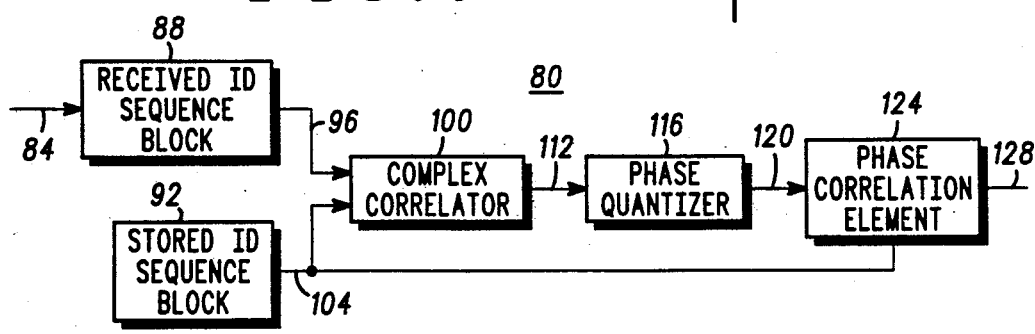
FIG.4

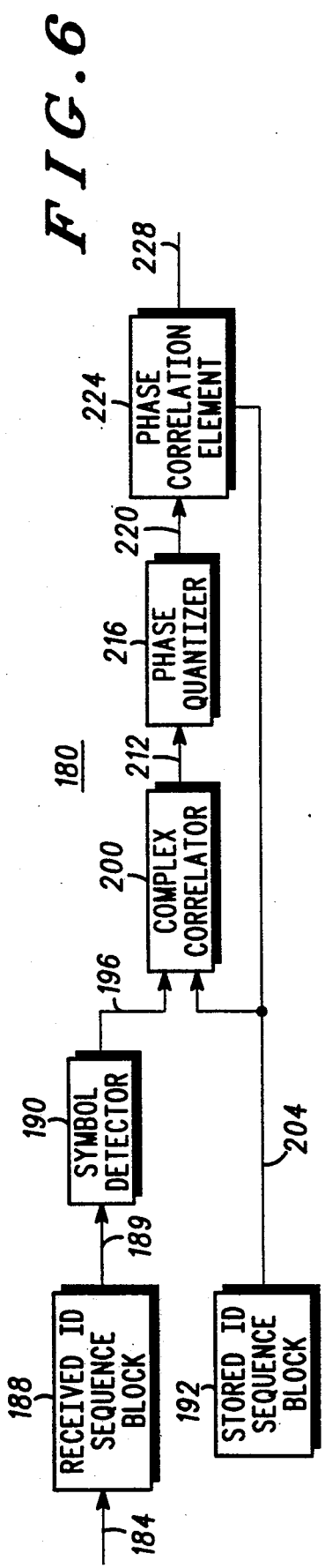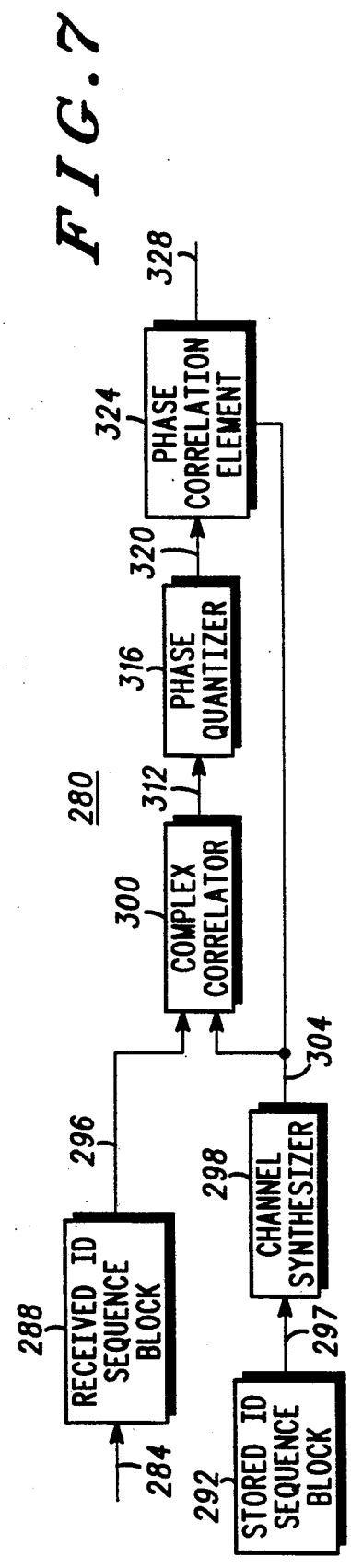

SYSTEM AND METHOD FOR DETERMINING ABSOLUTE PHASE OF A DIFFERENTIALLY-ENCODED, PHASE-MODULATED SIGNAL

BACKGROUND OF THE INVENTION

The present invention relates generally to systems for radio receivers operative to receive differentially-encoded, phase-modulated signals, and, more particularly, to a system, and associated method, for determining the absolute phase of the differentially-encoded, phase-modulated signals received by the radio receiver.

A communication system is operative to transmit information (referred to hereinbelow as an "information signal") between two or more locations, and includes a transmitter and a receiver interconnected by a transmission channel. Information is transmitted by the transmitter to the receiver upon the transmission channel. A radio communication system is a communication system in which the transmission channel comprises a radio-frequency channel wherein the radio-frequency channel is defined by a range of frequencies of the electromagnetic frequency spectrum.

The transmitter forming a portion of a radio communication system includes circuitry for converting the information signal which is to be transmitted into a form suitable for transmission thereof upon the radio-frequency channel. Such circuitry is referred to as modulation circuitry which performs a process referred to as modulation. In such a process, the information signal is impressed upon a radio-frequency electromagnetic wave wherein the radio-frequency electromagnetic wave is of a frequency within the range of frequencies defining the radio-frequency channel upon which the information signal is to be transmitted. The radio-frequency electromagnetic wave is commonly referred to as the "carrier signal", and the radio-frequency electromagnetic wave, once modulated by the information signal, is commonly referred to as the modulated signal.

Various modulation schemes are known for impressing the information signal upon the carrier signal to form the modulated signal.

One such modulation scheme is phase modulation in which the information signal is impressed upon the carrier signal in a manner to cause the phase of the carrier signal to be altered corresponding to the information content of the information signal. Phase changes of the modulated signal thereby form the information content of the modulated signal. Proper detection of the phase of the modulated signal permits recreation of the information signal.

A related modulation scheme is differential phase modulation in which differential phase changes of the modulated signal (i.e., phase differences between adjacent portions of the modulated signal) form the information content of the modulated signal. Proper detection of differential phase changes of the modulated signal permits recreation of the information signal.

Radio communication systems are advantageous in that no physical interconnection is required between the transmitter and the receiver; once the information signal is modulated to form the modulated signal, the modulated signal may be transmitted over large distances.

A cellular, communication system is one type of radio communication system. Radio telephones operative in such a cellular, communication system contain circuitry permitting simultaneous generation and reception of modulated signals, to permit thereby two-way communication between the radio telephones and remotely-located transceivers. These remotely-located transceivers, commonly referred to as "base stations", are physically connected to conventional telephonic networks to permit communication between a radio telephone and a fixed location of the conventional telephonic network.

A cellular, communication system is formed by positioning numerous base stations at spaced-apart locations throughout a geographical area. Each base station contains circuitry to receive modulated signals transmitted thereto by one, or many, radio telephones, and to transmit modulated signals to the one, or many, radio telephones. A frequency band (in the United States, extending between 800 MHz and 900 MHz) is allocated for radio telephone communication upon a cellular, communication system.

The positioning of each of the base stations forming the cellular, communication system is carefully selected to ensure that at least one base station is positioned to receive a modulated signal transmitted by a radio telephone positioned at any location throughout the geographical area.

Because of the spaced-apart nature of the positioning of the base stations, portions of the geographical area throughout which the base stations are located are associated with individual ones of the base stations. Portions of the geographical area proximate to each of the spaced-apart base stations define "cells" wherein the plurality of cells (each associated with a base station) together form the geographical area encompassed by the cellular, communication system. A radio telephone positioned within the boundaries of any of the cells of the cellular, communication system may transmit, and receive, modulated signals to, and from, at least one base station.

As the base stations and radio telephones of the cellular, communication system contain circuitry to permit continuous and uninterrupted communication between the radio telephone and a base station associated with a cell in which the radio telephone is positioned as the ratio telephone is moved between cells, communication upon a cellular, communication system is particularly advantageous by one operating a radio telephone when travelling in an automotive vehicle.

Increased popularity of communication upon a cellular, communication system has resulted, in some instances, in the full utilization of every available channel of the frequency band allocated for cellular, radio telephone communication. As a result, various ideas have been proposed to utilize more effectively the frequency band allocated for radio telephone communication. By more efficiently utilizing the frequency band allocated for radio telephone communication, the transmission capacity of an existing cellular, communication system may be increased.

One such proposal permits two or more radio telephones to share a single transmission channel. When the two or more radio telephones transmit or receive signals over a single transmission channel, the capacity of an existing cellular, communication system may be doubled. While the signals transmitted from, or to, the radio telephones which share the same transmission channel can not be simultaneously transmitted (simultaneous transmission would cause signal overlapping, thereby preventing signal detection of either of the signals), the signals can be transmitted in intermittent bursts. By encoding an information signal into discrete form (to form, e.g., a discrete, binary data stream) and modulating the discretely-encoded signal generated by such encoding process, the resultant modulated signal may be transmitted in intermittent bursts. Such modulated signals may be recreated by the receiver to determine thereby the information content of the transmitted signal.

A modulation technique suitable for modulating the discretely-encoded information signal upon a carrier signal is the aforementioned, differential, phase modulation technique. More particularly, a specific, differential modulation technique, a $\pi/4$ differential, phase-shift-keying (DQPSK) modulation technique has been selected as the standard modulation technique for cellular, communication systems of increased capacity in the United States.

Encoding of an information signal into a discrete binary data stream is also advantageous as noise introduced upon the modulated signal during transmission thereof upon the transmission channel may be more easily detected and removed when the information signal is comprised of a discrete binary data stream than when the information signal is comprised of a conventional, analog signal.

In a receiver operative to receive such a modulated signal, evaluation of the absolute phase of the signal is not required to recreate the information signal, but, rather, changes in phase of the modulated signal are evaluated to recreate the information signal.

Distortion occurring during transmission of a modulated signal comprised of a discretely-encoded, information signal (and modulated by the $\pi/4$ DQPSK modulation technique above-noted) may be removed by equalizer circuitry forming a portion of the receiver circuitry. The equalizer may, for instance, comprise a maximum likelihood sequence estimator (MLSE) such as that described in an article entitled "Adaptive Maximum-Likelihood Receiver For Carrier-Modulated Data-Transmission System", by Gottfried Ungerboeck in the IEEE Transaction On Communication, Volume COM-22, No. 5, May 1974.

The MLSE disclosed therein is comprised of a matched filter and a Viterbi equalizer. Both the matched filter and the Viterbi equalizer may be implemented by an algorithm embodied in processor circuitry.

A modulated signal received by the receiver is demodulated by the modulator circuitry, and then applied to the matched filter of the MLSE. The matched filter generates a filtered signal which is supplied to the Viterbi equalizer. The Viterbi equalizer is operative to correct for distortions of the signal occurring during transmission thereof upon a frequency channel.

Equalizers which, as mentioned hereinabove, form portions of radio receivers operative to receive digitally-modulated signals are operative responsive to determination of the absolute phase of the modulated signals transmitted thereto. Because the information content of the DQPSK signal is contained in the phase changes of the signal rather than the absolute phase of the signal, equalizer circuitry inefficiently, and sometimes ineffectively, corrects for the distortions to a DQPSK signal received by the receiver.

What is needed, therefore, is means for the determining the absolute phase value of a differentially-encoded, phase-modulated signal transmitted to a receiver.

SUMMARY OF THE INVENTION

The present invention, accordingly, advantageously provides a system and associated method for determining the absolute phase of a differentially-encoded, phase-modulated signal transmitted to a receiver.

The present invention further advantageously provides a radio receiver operative to determine an absolute phase value of a differentially-encoded, phase-modulated signal transmitted thereto.

The present invention provides further advantages and features, details of which will become more apparent by reading the detailed description of the preferred embodiments here and below.

In accordance with the present invention, a system, and associated method for determining an absolute phase value of at least one symbol of a sequence of symbols forming a portion of a differentially-encoded, phase-modulated signal transmitted to a receiver is disclosed. Values representative of absolute phase values of a predetermined sequence of symbols of a portion of a desired, phase-modulated signal are stored to form thereby a stored set of values. The values of the stored set of values representative of the absolute phase values of the predetermined sequence of symbols are compared with a sequence of symbols of the differentially-encoded, phase-modulated signal transmitted to the receiver, to form thereby a comparison value having a level indicative of differences between the values of the stored set of values and the sequence of symbols transmitted to the receiver associated therewith. An absolute phase value of at least one symbol of the sequence of symbols of the differentially-encoded, phase-modulated signal transmitted to the receiver is then determined.

BRIEF DESCRIPTION OF THE DRAWINGS

The present invention will be better understood when read in light of the accompanying drawings in which;

FIG. 1A is a graphical representation of the constellation set formed of allowable signal levels of a signal modulated according to a $\pi/4$ differential, quadrature, phase-shift-keying ($\pi/4$ DQPSK) modulation technique;

FIG. 1B is a graphical representation of the constellation set formed of allowable signal levels of a signal modulated according to a differential quadrature phase-shift-keying (DQPSK) modulation technique;

FIG. 2 is a table representing a typical encoding scheme showing the relationship between serially-encoded data and corresponding phase changes of a $\pi/4$ DQPSK signal, and, also, between the serially-encoded data and corresponding phase changes of a DQPSK signal;

FIG. 3 is a representation of a portion of a signal transmitted by a base station of a cellular, communication system;

FIG. 4 is a block diagram of a first embodiment of the system of the present invention;

FIG. 5 is a graphical representation of an axis system which illustrates graphically operation of the phase quantizer which forms a portion of the block diagram of FIG. 4;

FIG. 6 is a block diagram of a second embodiment of the system of the present invention;

FIG. 7 is a block diagram of a third embodiment of the system of the present invention;

DESCRIPTION OF THE PREFERRED EMBODIMENTS

Figure 8:
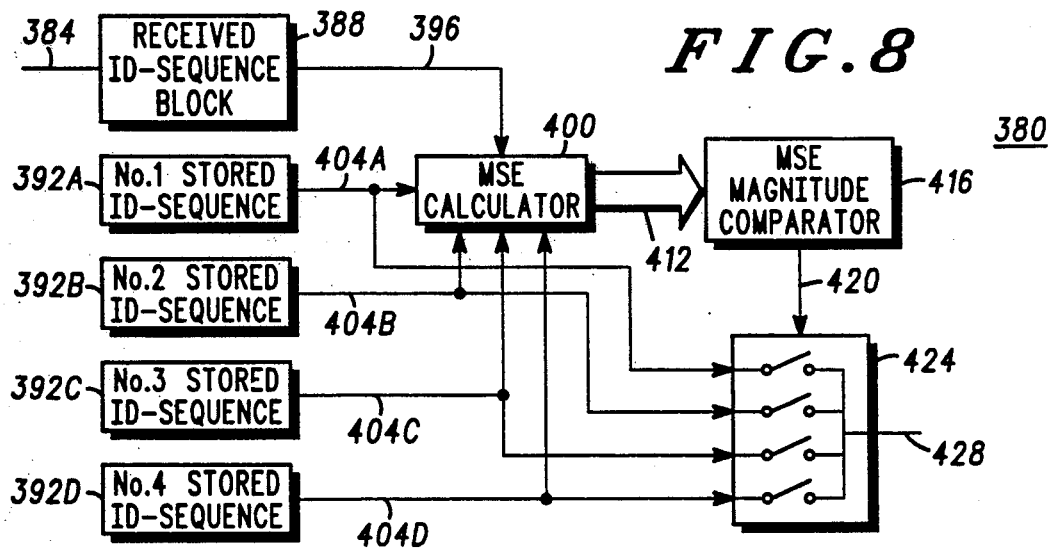
FIG. 8 is a block diagram of a fourth embodiment of the system of the present invention.

An electromagnetic wave may be described mathematically by a combination of a scaled, sine wave, and scaled, cosine wave according to the following equation:

$$s(t) = I(t) \cos(\omega t) + Q(t) \sin(\omega t)$$

where:

I(t) and Q(t) are time-varying functions which are referred to as "in-phase" and "quadrature-phase" components of a signal, respectively;

$\omega$ is the angular frequency of a carrier signal, or $2\pi f$, where f is the cyclic frequency of the carrier signal; and t is time (in seconds).

This equation may be graphically represented by plotting the resultant sum, s(t), as a function of time; alternately, the equation may be graphically represented on the axis system illustrated in FIG. 1.

With reference to FIG. 1A, therefore, abscissa axis 10 is scaled in terms of $\cos(\omega t)$, the cosine component of the wave form, and the ordinate axis 14 is scaled in terms of $\sin(\omega t)$, the sine component of the wave form. Abscissa axis 10 and ordinate axis 14 intersect at origin 18. Because any electromagnetic wave (disregarding harmonics) may be represented by the above equation, any electromagnetic wave may similarly be graphically represented, at any point in time, by a point on the axis system 10–14.

A modulated signal may be represented upon such an axis system by appropriate scaling of abscissa and ordinate axes 10 and 14, respectively. Points 22, 24, 26, 28, 30, 32, 34, and 36 are located upon a unit circle centered at origin 18, and spaced equidistantly from one another upon the unit circle. Points 22–36 are oftentimes represented in terms of their phase locations, as is conventional. Points 22–36 form the constellation set of allowable symbol values of a $\pi/4$ DQPSK modulated signal.

Represented in terms of phase, then, point 22 may be designated by the phase location of $\pi/4$ radians, point 24 may be designated by the phase location of $\pi/2$ radians, point 26 may be represented by phase location $3\pi/4$ radians, point 28 may be represented by phase location $\pi$ radians, point 30 may be represented by phase location $5\pi/4$ radians, point 32 may be represented by phase location $3\pi/2$ radians, point 34 may be represented by phase location $7\pi/4$ radians, and point 36 may be represented by phase location $0\pi$ radians.

A $\pi/4$, differentially-encoded quadrature phase-shift-keying ($\pi/4$ DQPSK) modulated signal generated by a $\pi/4$ DQPSK modulation technique is comprised of a plurality of symbol values, each having a symbol value corresponding to one of the allowable symbols represented by points 22–36. As mentioned hereinabove, however, the information content of a DQPSK system is contained in the differential phase changes of the modulated signal. Accordingly, evaluation of the differential phase changes of the $\pi/4$ DQPSK modulated signal allows the information content thereof to be recreated.

Allowable phase changes between adjacent symbols of a $\pi/4$ DQPSK-modulated signal are $+/-\pi/4$ radians and $+/-3\pi/4$ radians.

FIG. 1B is a graphical representation, similar to that of FIG. 1A, but which illustrates points forming the constellation set formed of allowable symbol values of a DQPSK modulated signal. The axis system is again comprised of abscissa and ordinate axes, here designated by reference numerals 10' and 14', which are scaled in terms of $\cos(\omega t)$ and $\sin(\omega t)$, respectively. Four points, here points 22', 26', 30', and 34', are located upon a unit circle centered at origin 18', and spaced equidistantly from one another upon the unit circle. Points 22'–36' are oftentimes represented in terms of their phase locations, as is conventional.

A DQPSK-modulated signal generated by a DQPSK modulation technique is comprised of a plurality of symbols, each having a symbol value corresponding to one of the allowable symbols represented by points 22'–36'. As the information content of a DQPSK-modulated signal is contained in the differential phase changes of the modulated signal, evaluation of the phase changes of the signal allows the information content thereof to be recreated.

It is important to note, at the outset, that, while the following description of the present invention discloses a preferred embodiment pertaining to a $\pi/4$ DQPSK modulation scheme, the teachings are present invention are similarly applicable to any phase-shift-keying modulation scheme, including the DQPSK modulation scheme represented in FIG. 1B.

Transmission of a modulated signal, such as a $\pi/4$ DQPSK-modulated signal upon a nonideal channel causes distortion of the transmitted signal. Such distortion is caused, for example, by noise and intersymbol interference.

Equalizer circuitry of a receiver is operative to remove such distortion caused by intersymbol interference of the transmitted signal to permit thereby accurate recreation of the actual, transmitted signal. However, as mentioned hereinabove, because equalizers are operative responsive to absolute phase values rather than differential phase changes, the efficiency of operation of such equalizers when a $\pi/4$ DQPSK signal is transmitted to the receiver is much reduced. The performance of other portions of digital receivers can also be improved by utilizing a portion of the received signal having a known absolute phase.

A radio transmitter operative to transmit an information signal, e.g., a voice signal, first digitizes the voice signal to form an encoded signal, such as a binary data stream. A modulator comprising a portion of the radio transmitter impresses the encoded signal onto a carrier signal to form the modulated signal. A modulator which forms a $\pi/4$ DQPSK-modulated signal converts the bit sequences of the encoded signal into phase changes of the modulated signal generated thereby.

A receiver operative to receive the $\pi/4$ DQPSK-modulated signal includes a demodulator (and, more particularly, a coherent demodulator), and further circuitry which is operative to convert the phase changes of the modulated signal into an encoded signal, such as a binary data stream.

FIG. 2 is a table representing a typical encoding scheme showing the relationship between serially-encoded data and corresponding phase changes of a π/4 DQPSK-modulated signal, or, alternately, between the serially-encoded data and corresponding phase changes of a DQPSK-modulated signal. Mapping between the serially-encoded data and the phase changes of a modulated signal may be permitted according to the encoding scheme.

The table of FIG. 2 represents an encoding scheme by which a transmitter converts a binary sequence into phase changes, or a receiver converts the detected phase changes of a modulated signal into a binary sequence. As four different phase changes are possible between adjacent symbols of a π/4 DQPSK-modulated signal, each phase change must be converted into a two-bit binary word. Column 1, indicated by reference numeral 50, represent the four possible phase changes between adjacent symbols of the π/4 DQPSK-modulated signal. Column 2, indicated by reference numeral 54, represents the corresponding two-bit words associated with each phase change of Column 1 of the table. It is, of course, noted that the encoding scheme shown in the table of FIG. 2 is but one of many possible encoding schemes.

Column 3, indicated by reference numeral 58, is similar to Column 1, but represents four possible phase changes between adjacent symbols of a DQPSK-modulated signal. Column 2 again represents the corresponding two-bit words, here associated with each phase change of Column 3 of the table.

FIG. 3 is a representation of the portion, here indicated generally by reference numeral 60, of a π/4 DQPSK-modulated signal transmitted by a base station of a cellular, communication system. The π/4 DQPSK-modulated signal transmitted therefrom is received by the receiver circuitry of a radio telephone.

Portion 60 is further divided into first segment 64, second segment 68, and third segment 72. First and third segments 64 and 72 are representative of random data, as indicated, and second segment 68 is representative of an "ID sequence".

The random data comprising segments 64 and 72 represent an information signal, here, more particularly, a modulated voice signal. (As an information signal is nondeterminative, an information signal may be considered to be random data, and is accordingly represented in the figure as such.)

The ID sequence of second segment 68 is a sequence, having predetermined bits, which is encoded (according, for instance, to the encoding scheme of FIG. 2) and interposed upon the signal transmitted by a base station at intermittent intervals. The ID sequence of second segment 68 may, for example, be comprised of a digital voice color code (DVCC) signal which will be transmitted in a United States Digital Cellular (USDC), cellular, communication system. Because the bit sequence that the modulated ID sequence represents is predetermined, knowledge of phase changes forming the ID sequence are known, or may be easily determined using the bit-to-differential mapping of the table of FIG. 2.

Although the information content of the DQPSK-modulated signal is contained only in the differential phase changes between adjacent symbols of the sequence, because the absolute phase value of any symbol of the π/4 DQPSK signal may be comprised of only one of a limited number of values (with respect to FIG. 1, a symbol of a π/4 DQPSK-modulated signal may be one of only four values, although the specific one of the four values is not necessarily known), the absolute phase of the symbols of the ID sequence of second segment 68 may be determined. By determining the absolute phase of the symbols of the ID sequence, the ID sequence symbols can be used as known information in other parts of the digital radio. For example, the absolute ID symbols can be used as training information in an adaptive filter such as a transversal channel equalizer or a channel estimator.

FIG. 4 is a functional block diagram of a first embodiment of the present invention, referred to here generally by reference numeral 80. System 80 of FIG. 4 is operative to determine the absolute phases of the symbols of the ID sequence received by a receiver. Again, once the absolute phases of the symbols of the ID sequence are determined, the ID-sequence symbols may be used to improve the performance of the receiver.

The π/4 DQPSK-modulated signal transmitted upon a transmission channel is received by a receiver, here a receiver portion of a radio telephone. Demodulation circuitry of the receiver converts the π/4 DQPSK-modulated signal downward in frequency to a baseband frequency. The π/4 DQPSK-modulated signal of the baseband frequency is supplied on line 84 to received ID sequence block 88 which, for example, may be comprised a buffer, such as a group of memory locations of a memory element. The received ID sequence is comprised of the the π/4 DQPSK-modulated signal at the baseband frequency.

A corresponding sequence of symbols having absolute phase values associated therewith is stored in storage sequence block 92 which, again, may be comprised of another buffer or series of memory locations of an electronic memory. The sequence of symbols stored in block 92 is a predetermined sequence corresponding to one of the four possible encoded ID sequences actually transmitted by a transmitter, here a base station. (It is noted that in a π/4 DQPSK-modulation scheme, there are four possible encoded ID sequences, each comprised of the same differential phase changes, but each having a different absolute starting phase corresponding to the four valid constellation points.) The sequence of symbols comprising the received ID sequence is supplied, by way of line 96 to complex correlator 100; similarly, the sequence of symbols comprising the stored ID sequence is supplied, by way of line 104 to complex correlator 100.

Complex correlator 100 is operative to execute the following mathematical expression:

$$R = \sum_{i=1}^{n} a^*_{si} y_i$$

where:
  R is the complex correlation;
  each $a_{si}$ is a symbol of the sequence of symbols forming the stored, absolute ID sequence; ànd
  each $y_i$ is an element of the received ID sequence.

Because the absolute phases of the received symbols of the ID sequence are not known, but may be of any of four possible values, there is a "four-fold" phase ambiguity of the received ID sequence. The stored ID sequence stored in block 92 is one of four possible ID sequences.

The value of the correlation, R, formed by the above mathematical expression, provides an indication of the correlation between the stored ID sequence and the received ID sequence. A signal indicative of the value of the complex correlation, R, is generated on line 112 which is supplied to phase quantizer 116.

Because the value of the calculated complex correlation, R, is a complex value, a phase is associated therewith. Phase quantizer 116 is operative to quantify that phase and to generate a quantized phase value indicative of such quantified phase on line 120. Line 120 is coupled to phase correction element 124. Element 124 is also coupled to receive values indicative of the stored ID sequence generated on line 104. Phase correction element 124 generates a corrected phase signal on line 128.

Operation of quantizer 116 may be represented graphically by the graphical representation of FIG. 5. Phase quantizer 116 is operative to determine the phase of the value of the complex correlation, R, supplied thereto on line 112. Similar to the axis system of FIG. 1, the axis system of FIG. 5 includes an abscissa axis, here abscissa axis 140, the I axis, and ordinate axis, here axis 144, the Q axis, which intersect at origin 148. The phase of the complex correlation, R, may be plotted upon the axis system comprised of axes 140-144. The phase of the complex correlation, R, is denoted by a point upon the axis system.

Perpendicularly-extending lines 152 and 156 which intersect at origin 148 are also shown in the graphical representation of FIG. 5. Lines 152-156 define four regions, here denoted by reference numerals 160, 164, 168, and 172. The phase of the complex correlation, R, when plotted upon axis system 140-144 is located in one of the regions 160-172. Phase quantizer 116 is operative to determine the regions 160-172 to which the phase of the complex correlation, R, is associated. The phase correction value generated by phase quantizer 116 on line 120 is of a value corresponding to the region in which the complex correlation, R, is located.

Phase correction element 124, which receives the signal indicative of the phase correction value generated on line 120 adjusts the phases of the symbols of the stored ID sequence responsive to the value of the quantized phase value. By adjusting a known phase value (i.e., the stored ID sequence) by a phase correction value, another absolute phase value, and now an accurate, absolute phase value, is generated.

In such manner, even though the differentially-encoded, DQPSK signal does not intrinsically contain any information as to the absolute phases of the symbols, the absolute phases of the symbols may be determined.

FIG. 6 is a functional block diagram of an alternate embodiment of the system of the present invention, here indicated generally by reference numeral 180. System 180 of FIG. 6 is similar to that of system 80 of FIG. 4, and is operative to receive the π/4 DQPSK-modulated signal of a baseband frequency on line 184. Symbols of portions of the π/4 DQPSK-modulated signal of the baseband frequency form the received ID sequence which is stored in received ID sequence block 188, and which corresponds to received ID sequence block 88 of system 80 of FIG. 4. Again, block 188 may be embodied by a buffer or other electronic memory.

System 180 of FIG. 6 differs from system 80 of FIG. 4 in that block 188 generates data corresponding to the received ID sequence on line 189 which is supplied to symbol detector 190. Detector 190 is operative to assign allowable values to the data supplied thereto. Symbol 190 may, for example, be comprised of a quantizer, an adaptive equalizer, or a Maximum Likelihood detector. As the particular symbol detector used can be chosen to match the particular system characteristics, system 180 may, accordingly, in some instances, be preferred over system 80 of FIG. 4.

Similar to block 92 of system 80 of FIG. 4, block 192 of system 180 stores a predetermined ID sequence having absolute phases associated with the value thereof. The received ID sequence, as detected by detector 190 is supplied, by way of line 196 to complex correlator 200; similarly, the stored, ID sequence stored by block 192 is supplied to complex correlator 200 by way of line 204.

Complex correlator 200 is operative in a manner similar to that of complex correlator 100 of system 80 to calculate a complex correlation, R, value which is generated on line 212, and supplied to phase quantizer 216.

Phase quantizer 216 is operative in a manner similar to that of phase quantizer 116 of system 80, to generate a quantize phase value on line 220.

Line 220 is coupled to phase correction element 224. Element 224 is also coupled to receive values indicative of the stored ID sequence generated on line 204. Phase correction element 224 generates a signal on line 228. Element 224 adjusts the phases of the symbols of the stored ID sequence responsive to values of the quantized phase value to determine an absolute phase value.

Addition of detector 190 to system 180 of FIG. 6 reduces signal disparities and distortions caused by noise and any interference upon a transmission channel upon which the π/4 DQPSK-modulated signal is transmitted to the receiver. Therefore, use of system 180 may be advantageously utilized in environment in which the transmission channels upon which the modulated signals are transmitted exhibit significant amounts of noise and distortion.

The functional block diagram of FIG. 7 illustrates another alternate embodiment of the system, here indicated generally by the reference numberal 280, of the present invention. Again, demodulation circuitry of the receiver converts the π/4 DQPSK-modulated signal downward in frequency to a baseband frequency. The π/4 DQPSK-modulated signal of the baseband frequency is supplied on line 284 to received ID sequence block 288. The received ID sequence is comprised of differential phase changes between adjacent symbols of portions of the π/4 DQPSK-modulated signal of the baseband frequency. Block 288 is similar to blocks 188 and 88 of systems 80 and 180 of the preceding figures. Again, block 288 may be formed of a buffer or memory locations of an electronic memory.

Data indicative of a predetermined ID sequence, including absolute phase values thereof, are stored in stored ID sequence block 292. Block 292 is similar to blocks 192 and 92 of embodiments of the preceding figures.

Signals indicative of the symbols of the stored ID sequence, stored in block 292, are generated on line 297 and supplied to channel synthesizer 298. Channel synthesizer 298 synthesizes the transmission channel upon which the DQPSK-modulated signal is transmitted to the radio receiver. Synthesizer 298 may, for example, be comprised of a finite impulse response (FIR) filter, well known per se in the art. The FIR filter of which synthesizer 298 is preferably comprised is an adaptive filter and is operative to synthesize transmission of the stored ID sequence stored in block 292 over the transmission channel upon which the DQPSK-modulated signal is actually transmitted. Because the FIR filter is an adaptive filter, the channel synthesizer is model of the symbol-rate, sampled channel impulse response including any intersymbol interference components. A synthesized-transmission signal is supplied to complex correlator 300 by way of line 304.

Complex correlator 300 is operative, in manners similar to complex correlators 100 and 200 of systems 80 and 180 of the preceding figures to calculate a complex correlation, R, value. Complex correlator 300 generates a signal indicative of the value of the calculated complex correlation, R, on line 312 which is supplied to phase quantizer 316.

Phase quantizer 316, also operative in manners similar to phase quantizers 116 and 216 of systems 80 and 180, respectively, of the preceding figures, quantizes the phase of the complex correlation, R, supplied thereto on line 312, and generates a quantized phase value on line 320.

Line 320 is coupled to phase correction element 324. Element 324 is also coupled to receive values indicative of the stored ID sequence generated on line 304. Element 324 generates a signal on line 328. Phase correction element 324 adjusts the phase of the stored ID sequence responsive to values of the quantized phase value to determine an absolute phase value.

FIG. 8 is a functional block diagram of yet another alternate embodiment of the system, here indicated generally by reference numeral 380, of the present invention. Similar to preceding embodiments, demodulation circuitry of the receiver converts a $\pi/4$ DQPSK-modulated signal downward in frequency to a baseband frequency. The $\pi/4$ DQPSK-modulated signal of the baseband frequency is supplied on line 384 to received ID sequence block 388. Similar to corresponding blocks of FIGS. 4, 6, and 7, received ID-sequence block 388 may be comprised of a buffer or memory location of an electronic memory.

As the symbols of DQPSK-modulated signal may be of any of four values, each of the four possible values of ID-sequences are stored in respective ones of the stored ID sequence blocks 392A, 392B, 392C, or 392D.

The data stored in received ID sequence block 388 is supplied, by way of line 396 to means square error (MSE) calculator 400. Similarly, the data stored in blocks 392A, 392B, 392C, and 392D are supplied to MSE calculator 400 on lines 404A, 404B, 404C, and 404D, respectively.

MSE calculator 400 is operative to calculate the following equation:

$$E_k = \frac{1}{n} \sum_{i=1}^{n} |a_{si} - y_i|^2$$

where:
$E_k$ is the mean square error for a kth, stored, ID sequence (of which k ∈ {1, 2, 3, 4} in the embodiment of FIG. 8);
n is the number of symbols of which the ID sequence is comprised;
each $a_{si}$ is a symbol of the sequence of symbols forming the stored, absolute ID sequence; and
each $y_i$ is an element of the received ID sequence.

MSE calculator 400 calculates the mean square error for each of the stored ID-sequences stored in blocks 392A–392D and generates signals representative of such calculated values on line 412 to MSE magnitude comparator 416. MSE magnitude comparator 416 compares the magnitude of the four different error values calculated by calculator 400, and generates a signal on line 420 indicative of the stored ID-sequence having the smallest, calculated mean square error associated therewith. Line 420 is coupled to switching circuit 424 to permit generation on line 428 the ID-sequence having the smallest mean square error value associated therewith. The absolute phases of the selected ID-sequence may be utilized to provide, for example, information pertaining to the absolute phases of the symbols applied to equalizer circuitry of the receiver, to improve thereby the receiver performance.

Figure 9:
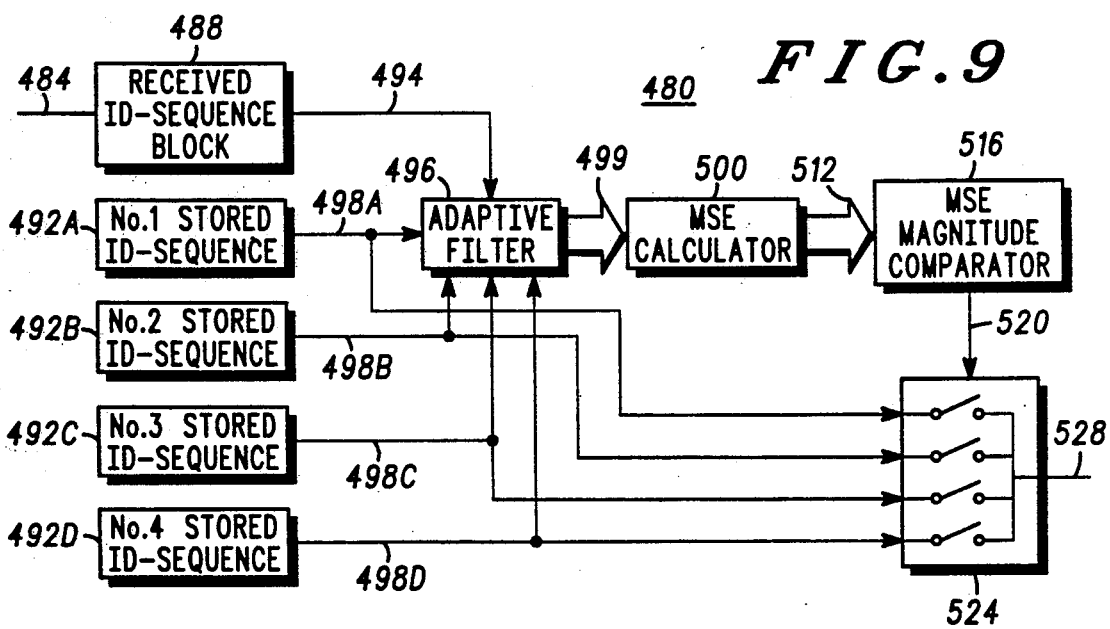
FIG. 9 is a block diagram of a fifth embodiment of the system of the present invention.

FIG. 9 is a functional block diagram of still another alternate embodiment of the system, here indicated generally by reference numeral 480, of the present invention. Similar to preceding embodiments, demodulation circuitry of the receiver converts a $\pi/4$ DQPSK-modulated signal downward in frequency to a baseband frequency. The $\pi/4$ DQPSK-modulated signal of the baseband frequency is supplied on line 484 to received ID sequence block 488. Similar to corresponding blocks of FIGS. 4, 6, 7, and 8 received ID-sequence block 488 may be comprised of a buffer or memory location of an electronic memory.

As the symbols of DQPSK-modulated signal may be of any of four values, each of the four possible values of ID-sequences are stored in respective ones of the stored ID sequence blocks 492A, 492B, 492C, or 492D.

The data stored in received ID sequence block 488 is supplied, by way of line 494 to adaptive filter 496. Similarly, the data stored in blocks 492A, 492B, 492C, and 492D are supplied to adaptive filter 496. Adaptive filter 496 generates error signals on lines 499 which are supplied to mean square error calculator 500. Adaptive filter 496 may comprise, for example, a transversal channel equalizer or a channel estimator. MSE calculator 500 is operative to calculate the following equation:

$$E_k = \frac{1}{n} \sum_{i=1}^{n} |e_i|^2$$

where:
$E_k$ is the mean square error for a $k^{th}$, stored, ID sequence (of which k ∈ {1, 2, 3, 4} in the embodiment of FIG. 9;
n is the number of symbols of which the ID sequence is comprised; and
each $e_i$ is an error signal generated by the adaptive filter.

MSE calculator 500 calculates the mean square error for each of the stored ID-sequences stored in blocks 492A–492D, once processed by adaptive filter 496, and generates signals representative of such calculated values on lines 512 to MSE magnitude comparator 516. MSE magnitude comparator 516 compares the magnitude of the four different MSE values calculated by calculator 500, and generates a signal on line 520 indicative of the stored ID-sequence having the smallest, calculated mean square error associated therewith. Line 520 is coupled to switching circuit 524 to permit generation on line 528 the ID-sequence having the smallest mean square error value associated therewith. The absolute phases of the selected ID-sequence may be utilized to provide, for example, information pertaining to the absolute phases of the symbols applied to equalizer circuitry of the receiver, to improve thereby the receiver performance.

Figure 10:
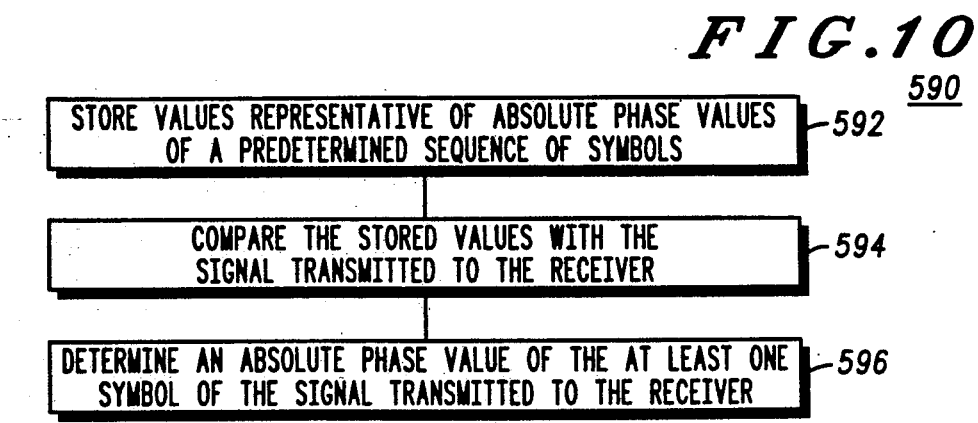
FIG. 10 is a logical flow diagram listing the steps of the method of the preferred embodiment of the present invention.

FIG. 10 is a logical flow diagram, referred to generally by reference numeral 590, listing the method steps of the method of the preferred embodiment of the present invention for determining an absolute phase value of at least one symbol of a sequence of symbols forming a portion of a differentially-encoded, phase-modulated signal transmitted to a receiver.

First, and as indicated by block 592, values representative of absolute phase values of a predetermined sequence of symbols of a portion of a desired phase-modulated signal is stored. Next, and as indicated by block 594, the values of the stored set of values representative of the absolute phase values of the predetermined sequence of symbols is compared with a sequence of symbols of the differentially-encoded, phase-modulated signal transmitted to the receiver to form thereby a comparison value having a phase angle indicative of phase differences between the values of the stored set of values and the sequence of symbols transmitted to the receiver associated therewith.

Next, and as indicated by block 596, an absolute phase value of the at least one symbol of the sequence of symbols of the differentially-encoded, phase-modulated signal transmitted to the receiver is calculated.

Figure 11:
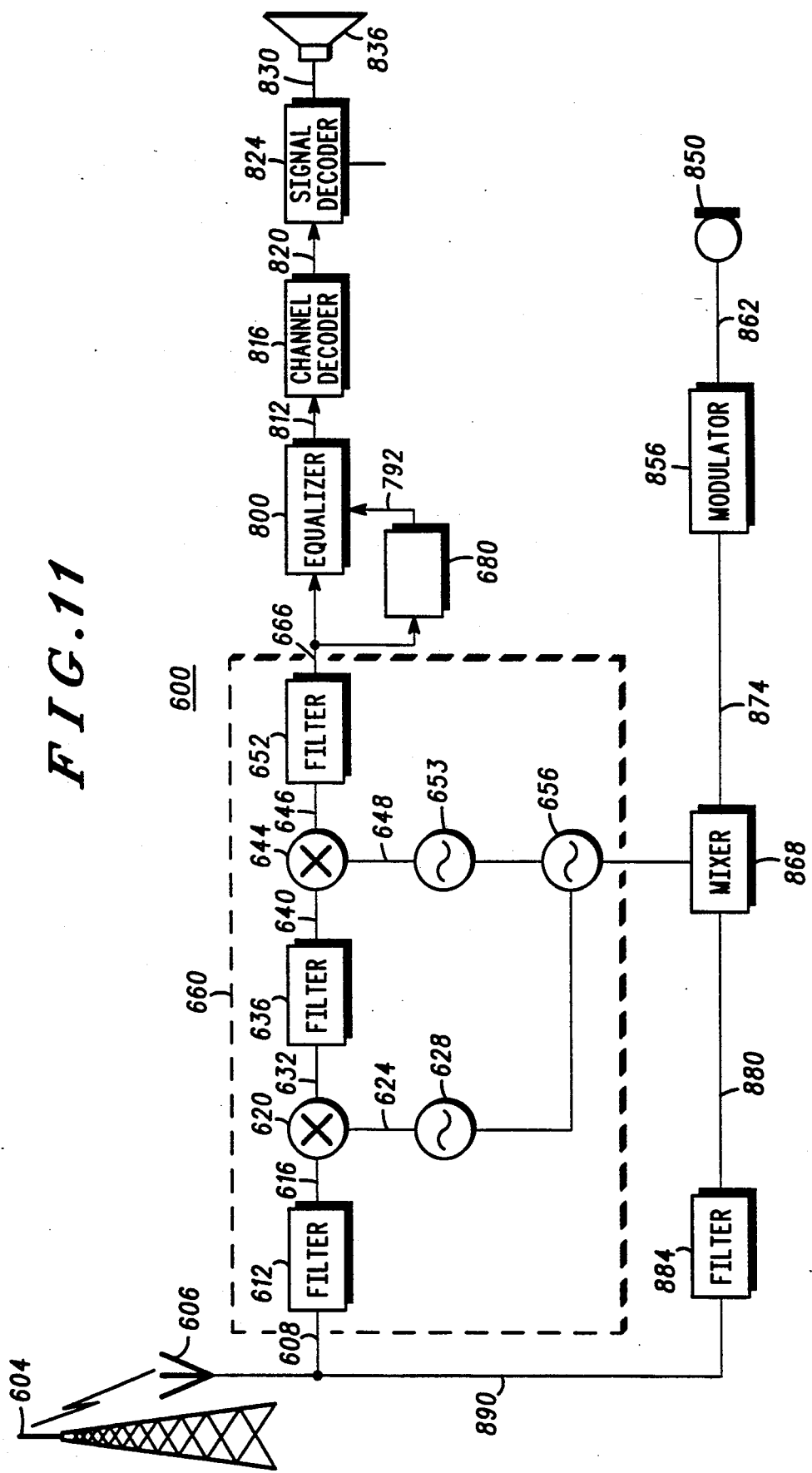
FIG. 11 is a block diagram of a radio telephone having the system of a preferred embodiment of the present invention forming a portion thereof.

FIG. 11 is a transceiver, referred to generally by reference numeral 600, constructed according to the teachings of the present invention. A signal transmitted by a transmitter, here indicated by antenna 606, is transmitted upon a transmission channel and received by antenna 606 of the transceiver. A signal indicative of the signal received by antenna 604 is generated on line 608 and supplied to filter 612. Filter 612 generates a filtered signal on line 616 which is supplied to first down-mixer circuit 620. Mixer circuit 620 additionally receives an oscillating signal on line 624 which is generated by oscillator 628.

Mixer circuit 620 generates a down-mixed signal on line 632 which is supplied to filter 636. Filter 636 generates a filtered signal on line 640 which is supplied to second down-mixer 644. Second down-mixer 644 also receives an oscillating signal on line 648 generated by oscillator 653. The oscillating frequencies of oscillators 628 and 653 are preferably, and as illustrated, controlled by the oscillating frequency of reference oscillator 656 by way of their respective connections thereto on lines 660 and 664.

Second down-mixer 644 generates a signal on line 648 which is supplied to filter 652. Filter 652 generates a filtered signal on line 666.

Elements referred to collectively by reference numerals 612-656 together comprise coherent demodulator 660, represented in the figure by the block, shown in hatch.

System 680, here indicated by a single block, corresponds to systems 80, 180, 280, 380, or 480 of the preceding figures.

System 680 is operative according to one of the previously-mentioned systems to generate a phase correction value and to determine the absolute phase value of the symbols of the differentially-decoded DQPSK signal received by transceiver 600. System 680 generates a signal indicative of the value calculated thereat on line 792 which is supplied to equalizer 800. The signal may be utilized as a training signal by equalizer 800. (Such training signal may additionally be applied to other circuitry of the transceiver.) Equalizer 800 is also coupled to receive the signal generated on line 666 by filter 652.

Equalizer 800 includes means for converting from absolute phase symbols to differential bit data, and is operative to generate an equalized signal on line 812 which is supplied to channel decoder 816.

Channel decoder 816 generates a decoded signal on line 820 which is supplied to signal decoder 824. Decoder 824 generates a signal on line 830 which is supplied to speaker 836.

The block diagram of transceiver 600 further illustrates a transmit-portion of the transceiver. The transmit-portion of transceiver 600 is shown to comprise, generally, transducer 850, such as a microphone which is coupled to modulator 856 by way of line 862, mixer 868 which is coupled to receive the modulated signal generated by modulator 856 on line 874. Circuitry of mixer 868 also receives oscillating signals generated by reference oscillator 656, here indicated by connection of mixer 868 and oscillator 656 by way of line 874. Mixer 868 generates a mixed signal on line 880 which is supplied to filter 884. Filter 884 and filter 612 may, for example, comprise a conventional duplexer. Filter 884 generates a filtered signal on line 890 which is coupled to antenna 606 to transmit a signal therefrom.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A method for determining an absolute phase value of at least one symbol of a differentially-encoded, phase-modulated signal comprised of sequences of symbols transmitted to a receiver, said method comprising the steps of:

storing values, to form thereby a stored set of values, representative of absolute phase values of a predetermined sequence of symbols of a portion of a desired, phase-modulated signal;

comparing the values of the stored set of values representative of the absolute phase values of the predetermined sequence of symbols with a sequence of symbols of the differentially-encoded, phase-modulated signal transmitted to the receiver, thereby forming a comparison value comprised of at least one component portion wherein said comparison value is indicative of differences between the values of the stored set of values and the sequence of symbols transmitted to the receiver associated therewith;

determining an absolute phase value of the at least one symbol of the sequence of symbols of the differentially-encoded, phase-modulated signal transmitted to the receiver responsive to values of said at least one component portion of the comparison value formed during said step of comparing.

2. The method of claim 1 wherein said step of storing values representative of the absolute phase values comprises storing said values representative of the absolute phase values in a memory element located within the receiver.

3. The method of claim 1 wherein said step of storing values representative of the absolute phase values of a predetermined sequence of symbols comprises storing values representative of the absolute phase values of an identification sequence comprised of a set of symbols which forms a portion of a differentially-encoded, phase-modulated signal.

4. The method of claim 1 wherein said step of comparing comprises the step of correlating the values of the stored set of values representative of the absolute phase values of the predetermined sequence of symbols with a sequence of symbols of the differentially-encoded, phase-modulated signal transmitted to the receiver, thereby forming a complex, correlation value which forms the comparison value wherein the complex, correlation value has a phase angle associated therewith.

5. The method of claim 4 wherein said step of comparing further comprises the preliminary step of quantizing the sequence of symbols of the differentially-encoded, phase-modulated signal transmitted to the receiver to form a quantized sequence of symbols thereby, and said step of correlating comprises the step of correlating the values of the stored set of values representative of the absolute phase values of the predetermined sequence of symbols with the quantized sequence of symbols representative of the sequence of symbols of the differentially-encoded, phase-modulated signal transmitted to the receiver.

6. The method of claim 1 comprising the further step of synthesizing transmission of the stored set of values to form a synthesized-transmission set of values.

7. The method of claim 6 wherein said step of comparing comprises comparing the synthesized-transmission set of values with the sequence of symbols of the differentially-encoded, phase-modulated signal transmitted to the receiver, such that the comparison value formed thereby has a phase angle indicative of phase differences between the values of the synthesized-transmission set of values and the sequence of symbols transmitted to the receiver.

8. The method of claim 1 wherein said step of storing comprises storing values representative of absolute phase values of at least two predetermined sequences of symbols of a portion of a desired, phase-modulated signal to form thereby at least two stored sets of values.

9. The method of claim 8 wherein said step of comparing comprises the steps of calculating a mean square error value between the sequence of symbols of the differentially-encoded, phase-modulated signal transmitted to the receiver and each set of the at least two stored sets of values such that said at least two mean square error values formed thereby each form comparison values.

10. The method of claim 9 wherein said step of determining the absolute phase value comprises the steps of: determining magnitudes of the mean square error values calculated during said step of calculating; and selecting a value representative of an absolute phase value of a symbol of one of the stored values of the at least two predetermined sequences of symbols, said one of the at least two predetermined sequences of symbols having a mean square error value calculated during said step of calculating comprising the step of comparing of a smallest magnitude.

11. The method of claim 8 comprising the further steps of applying the stored set of values of the at least two stored sets of values, each of the stored sets of values having the values representative of the absolute phase values of the at least two predetermined sequences of symbols, respectively, to an adaptive filter; and generating error signals responsive thereto.

12. The method of claim 11 wherein said step of comparing comprises the step of calculating mean square error values of the error signals generated by the adaptive filter.

13. The method of claim 12 wherein said step of determining the absolute phase value comprises selecting the at least one value associated with one of the at least two predetermined sequences comprising one of the at least two stored sets of values having a mean square error value of a smallest magnitude.

14. The method of claim 1 comprising the further step of applying a signal indicative of the absolute phase value generated during said step of determining as a training signal to an equalizer.

15. A system for determining an absolute phase value of at least one symbol of a differentially-encoded, phase-modulated signal comprised of sequences of symbols transmitted to a receiver, said system comprising:
means for storing values, to form thereby a stored set of values, representative of absolute phase values of the predetermined sequence of symbols of a portion of a desired, phase-modulated signal;
means for comparing the values of the stored set of values representative of the absolute phase values of the predetermined sequence of symbols with a sequence of symbols of the differentially-encoded, phase-modulated signal transmitted to the receiver, thereby forming a comparison value comprised of at least one component portion wherein said comparison value is indicative of differences between the values of the stored set of values and the sequence of symbols transmitted to the receiver associated therewith; and
means for determining an absolute phase value of the at least one symbol of the sequence of symbols of the differentially-encoded, phase-modulated signal transmitted to the receiver responsive to values of said at least one component portion of the comparison value determined during said means for comparing.

16. The system of claim 15 wherein said means for storing values representative of the absolute phase values comprises means for storing said values representative of the absolute phase values in a memory element located within the receiver.

17. The system of claim 15 wherein said means for storing values representative of the absolute phase values of a predetermined sequence of symbols comprises storing values representative of the absolute phase values of an identification sequence comprised of a set of symbols which forms a portion of a differentially-encoded, phase-modulated signal.

18. The system of claim 15 wherein said means for comparing comprises means for correlating the values of the stored set of values representative of the absolute phase values of the predetermined sequence of symbols with a sequence of symbols of the differentially-encoded, phase-modulated signal transmitted to the receiver, thereby forming a complex, correlation value which forms the comparison value wherein the complex, correlation value has a phase angle associated therewith.

19. The system of claim 18 wherein said means for comparing further comprises means for quantizing the sequence of symbols of the differentially-encoded, phase-modulated signal transmitted to the receiver to form a quantized sequence of symbols thereby and said means for correlating comprising the means for comparing comprises means for correlating the values of the stored set of values representative of the absolute phase values of the predetermined sequence of symbols with the quantized sequence of symbols representative of the sequence of symbols of the differentially-encoded, phase-modulated signal transmitted to the receiver.

20. The system of claim 15 further comprising means for synthesizing transmission of the stored set of values to form a synthesized-transmission set of values.

21. The system of claim 20 wherein said means for comparing comprises means for comparing the synthesized-transmission set of values generated by said means for synthesizing transmission with the sequence of symbols of the differentially-encoded, phase-modulated signal transmitted to the receiver, such that the comparison value formed thereby has a phase angle indicative of phase differences between the values of the synthesized-transmission set of values and the sequence of symbols transmitted to the receiver.

22. The system of claim 15 wherein said means for storing comprises means for storing values representative of absolute phase values of at least two predetermined sequences of symbols of a portion of a desired, phase-modulated signal to form thereby at least two stored sets of values.

23. The system of claim 22 wherein said means for comparing comprises means for calculating a mean square error value between the sequence of symbols of the differentially-encoded, phase-modulated signal transmitted to the receiver and each set of the at least two stored sets of values such that said at least two mean square error values formed thereby each form comparison values.

24. The system of claim 23 wherein said means for calculating comprises processor circuitry having an algorithm embodied therein.

25. The system of claim 23 wherein said means for calculating comprises; means for determining magnitudes of the mean square error values calculated during said step of calculating; and means for selecting a value representative of an absolute phase value of a symbol of one of the stored values of the at least two predetermined sequences of symbols, said one of the at least two predetermined sequences of symbols having a mean square error value of a smallest magnitude.

26. The system of claim 22 further comprising: means for applying the stored set of values of the at least two stored sets of values, each of the stored sets of values having the values representative of the absolute phase values of the at least two predetermined sequences of symbols, repsectively, to an adaptive filter; and means for generating error signals responsive thereto.

27. The system of claim 26 wherein said means for comparing comprises means for calculating mean square error values of the error signals generated by the adaptive filter.

28. The system of claim 27 wherein said means for determining the absolute phase value comprises selecting the at least one value associated with one of the at least two predetermined sequences comprising one of the at least two stored sets of values having a mean square error value of a smallest magnitude.

29. The system of claim 15 further comprising means for applying a signal indicative of the absolute phase value generated by said means for determining as a training signal.

30. In a radio receiver having receiver circuitry operative to receive a sequence of symbols forming a portion of a differentially-encoded, phase-modulated signal transmitted thereto, the combination with the radio receive of: a system for determining an absolute phase value of at least one symbol of a differentially-encoded, phase-modulated signal comprised of sequences of symbols transmitted to the receiver, wherein said system comprises:

means for storing values, to form thereby a stored set of values, representative of absolute phase values of a predetermined sequence of symbols of a portion of a desired, phase-modulated signal;

means for comparing the values of the stored set of values representative of the absolute phase values of the predetermined sequence of symbols with a sequence of symbols of the differentially-encoded, phase-modulated signal transmitted to the receiver, thereby forming a comparison value having a phase angle indicative of phase differences between the values of the stored set of values and the sequence of symbols transmitted to the receiver associated therewith;

means for quantizing the phase angle associated with the comparison value to form a quantized phase value thereby; and means for calculating an absolute phase value of the at least one symbol of the sequence of symbols of the differentially-encoded, phase-modulated signal transmitted to the receiver responsive to a value of the quantized phase value quantized by said means for quantizing.

* * * * *